(12) United States Patent
Mallavarapu et al.

(10) Patent No.: US 8,369,838 B2
(45) Date of Patent: Feb. 5, 2013

(54) ALERTS FOR DRIVERS OF WIRELESS COMMUNICATION RESTRICTIONS

(75) Inventors: Rekha Mallavarapu, Naperville, IL (US); Eric A. Duesing, Naperville, IL (US)

(73) Assignee: Alcatel Lucent, Paris (FR)

( * ) Notice: Subject to any disclaimer, the term of this patent is extended or adjusted under 35 U.S.C. 154(b) by 131 days.

(21) Appl. No.: 13/065,306

(22) Filed: Mar. 18, 2011

(65) Prior Publication Data

US 2012/0238286 A1  Sep. 20, 2012

(51) Int. Cl.
*H04M 1/725* (2006.01)
(52) U.S. Cl. ............... 455/412.2; 455/412.1; 455/414.1; 455/422.1; 455/424; 455/425; 340/988; 340/995.13; 340/426.19; 340/426.2
(58) Field of Classification Search .... 455/412.1–412.2, 455/414.1–414.3, 419–421, 422.1, 424–425, 455/435.1, 456.1–456.6, 457; 340/988–994, 340/955.13, 426.15, 426.19, 426.2
See application file for complete search history.

(56) References Cited

U.S. PATENT DOCUMENTS

| | | | |
|---|---|---|---|
| 2004/0203918 A1* | 10/2004 | Moriguchi et al. | 455/456.1 |
| 2006/0148465 A1* | 7/2006 | Perdomo et al. | 455/422.1 |
| 2009/0325566 A1* | 12/2009 | Bell et al. | 455/419 |
| 2012/0088446 A1* | 4/2012 | Fyke et al. | 455/1 |

* cited by examiner

*Primary Examiner* — Wayne Cai
(74) *Attorney, Agent, or Firm* — Carmen Patti Law Group, LLC (57) ABSTRACT

An exemplary method provides for a wireless mobile unit an alert representing a warning that legally imposed restrictions on the use of wireless mobile units by drivers of moving vehicles in predetermined zones. The method includes determining by a communication system if a first mobile unit is being used for wireless communications, and acquiring by the communication system the location of the first mobile unit. The communication system compares the location of the first mobile unit to locations of the predetermined zones having restrictions on the use of wireless mobile units by drivers of moving vehicles. Upon the first mobile unit entering a warning zone that is adjacent the predetermined zone and the first mobile unit being used for wireless communications, the transmission of an alert is initiated to the first mobile unit. The alert causes the first mobile unit to output an audible or visual communication available to the user of the first mobile unit, where the audible or visual communication provides a warning that a legally imposed restriction on the use of the first wireless mobile unit by a driver of moving vehicle is imposed in the predetermined zone.

19 Claims, 4 Drawing Sheets

ALERTS FOR DRIVERS OF WIRELESS COMMUNICATION RESTRICTIONS

BACKGROUND

This invention relates to wireless communications and more specifically to legally imposed restrictions on the use of wireless communication devices by moving vehicle drivers in predetermined locations or zones.

With the proliferation of wireless communication devices, many authorities have determined that the use of such wireless communication devices by the driver of a moving vehicle constitutes an increased safety hazard. This increased risk has been determined to be especially acute when the driver of a moving vehicle utilizes a wireless communication device in certain predetermined locations, i.e. in certain roadway zones such as in a school zone or in an area where workers are actively working on roadway construction. Some authorities have set prohibitions throughout a jurisdiction, e.g. no wireless device usage by a driver, except for hands-free usage, within the city limits.

Because different authorities have imposed different levels of restriction, it is difficult for drivers to appreciate when communication restrictions are in effect and/or the extent of communication restrictions. Thus, there is confusion among drivers as to what, if any, restrictions are in force in different zones since different levels of restriction may exist for the same type of zones in different jurisdictions. Different cities, municipalities and counties in the same state may impose different levels of communication restrictions in the same type of zone. For example, one city may ban all use of text messaging by drivers while in a roadway construction zone but permit hands-free voice communications, while an adjacent municipality only bans the transmission of text messages by drivers while in a roadway construction zone. Further, a city or statewide restriction on some types of wireless communications by drivers in a moving vehicle may exist, e.g. no texting while driving. In view of the segmented approach by different authorities to wireless communication restrictions applicable to drivers of moving vehicles, a substantial burden has been placed on drivers to discern what, if any, wireless communication restrictions are in force on different roadways in different jurisdictions.

SUMMARY

It is an object of the present invention to satisfy this need.

An exemplary method provides for a wireless mobile unit an alert representing a warning that legally imposed restrictions on the use of wireless mobile units by drivers of moving vehicles in predetermined zones. The method includes determining by a communication system if a first mobile unit is being used for wireless communications, and acquiring by the communication system the location of the first mobile unit. The communication system compares the location of the first mobile unit to locations of the predetermined zones having restrictions on the use of wireless mobile units by drivers of moving vehicles. Upon the first mobile unit entering a warning zone that is adjacent the predetermined zone and the first mobile unit being used for wireless communications, the transmission of an alert is initiated to the first mobile unit. The alert causes the first mobile unit to output an audible or visual communication available to the user of the first mobile unit, where the audible or visual communication provides a warning that a legally imposed restriction on the use of the first wireless mobile unit by a driver of moving vehicle is imposed in the predetermined zone.

Another embodiment of the present invention includes a computer program product that generally causes the implementation of the above method.

In another embodiment of the present invention, an application server carries out the general functions described in the above method.

DESCRIPTION OF THE DRAWINGS

Features of exemplary implementations of the invention will become apparent from the description, the claims, and the accompanying drawings in which:

DETAILED DESCRIPTION

One aspect of the present invention resides in the recognition that the wireless communication system can be utilized to assist drivers who use wireless communication devices to stay in compliance with legal restrictions that limit or prohibit the use of such devices in certain locations.

Figure 1:
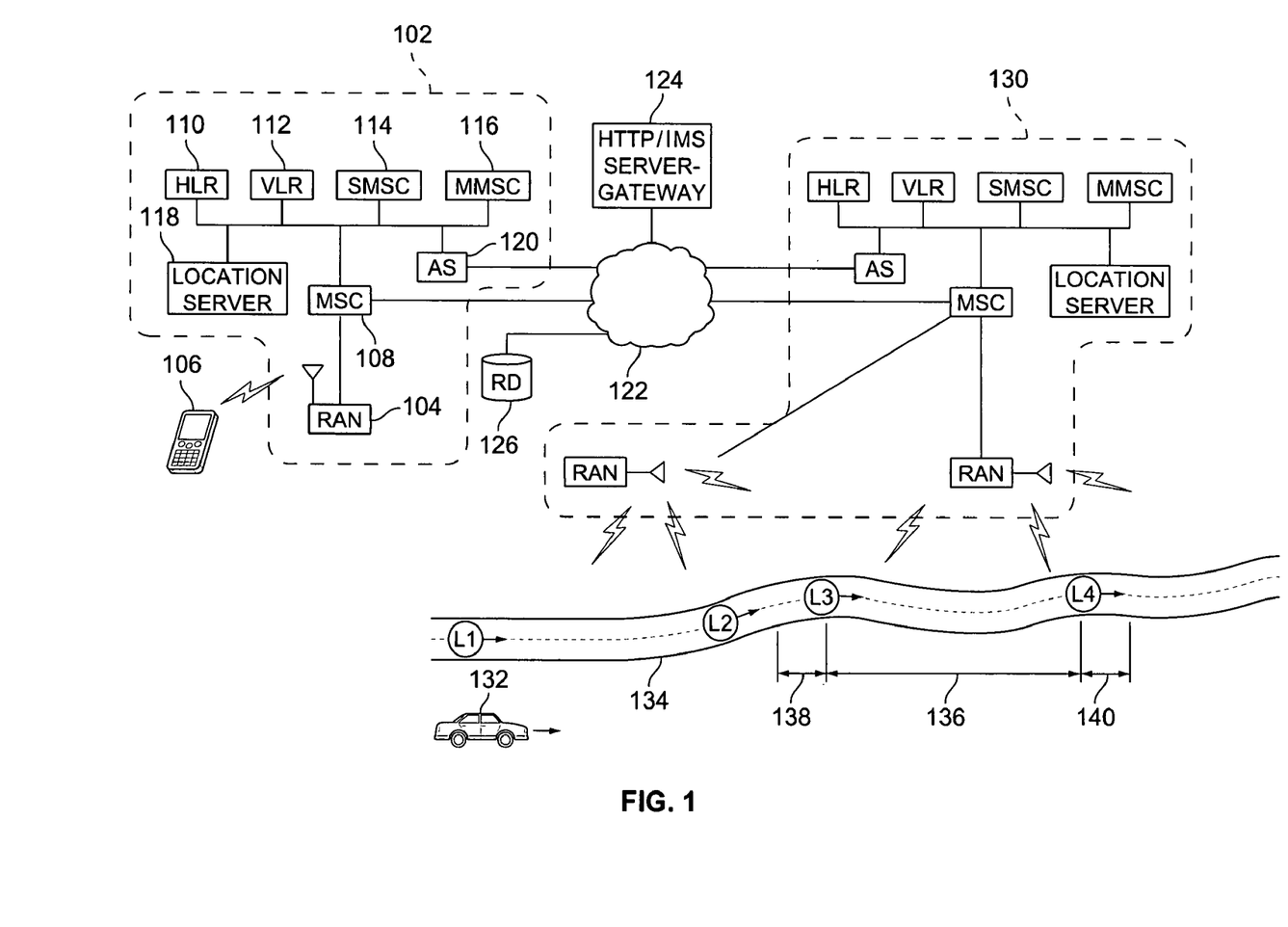
FIG. 1 illustrates a communication system suited for incorporation of an embodiment of the present invention.

Referring to FIG. 1, a wireless communications system 102 includes a radio access node (RAN) 104 that supports wireless communications between an exemplary wireless mobile unit (MU) 106 and mobile switching center (MSC) 108. The MSC is supported by a home location register (HLR) 110, a visitor location register (VLR) 112, a short messaging service center (SMSC) 114, and a multimedia service center (MMSC) 116. These nodes/elements perform their known functions as part of the infrastructure that supports wireless mobile communications. A location server 118 is coupled to this infrastructure and provides information as to the current location of wireless mobile units supported by system 102. The location information may be in the form of GPS coordinates received from respective mobile units and stored by the location server. Alternatively, location information may be obtained from the VLR 112 or calculated by the telecommunication infrastructure in accordance with known techniques. The function of the location server 118 may be incorporated into another infrastructure element thereby eliminating the need for a separate location server as illustrated in the diagram.

An application server (AS) 120 is coupled as shown to the infrastructure communication elements as well as to the communication network 122. As will be explained in more detail below, the application server 120 assists in implementing the steps of the illustrated methods in accordance with the present invention, i.e. determining if an alert should be sent to a mobile unit and determining the type of alert to be transmitted to the mobile unit. An exemplary restriction database (RD) 126 stores the types of legal restrictions imposed on drivers with regard to the use of wireless mobile units while driving and the locations associated with the respective restrictions. Database 126 is connected to the communication network 122 and provides access to this information by application server 120. If desired, the restriction database 126 could be implemented as part of the application server 120 or other nodes. An HTTP server and/or an Internet map server (IMS) 124 may be connected to the communication network 122 in order to provide a gateway to other nodes and communication networks.

Another communication system 130 provides wireless communication support for mobile units in a geographical area different from the area supported by communication system 102. The communication system 130 contains the same infrastructure elements previously described with regard to communication system 102. These infrastructure elements provide the same functionality previously described and hence these elements are not individually described again.

A vehicle 132 is traveling from left to right along the illustrated roadway 134. The driver of this vehicle utilizes a wireless mobile unit, e.g. a cellular phone with or without capabilities for text messaging and/or internet access, wireless enabled personal digital assistant, laptop personal computer enabled for communications via telecommunication carrier access, etc., for communications. The illustrative locations L1, L2, L3 and L4 along roadway 134 represent different positions of vehicle 132 as it travels along this roadway. A governmental authority having jurisdiction over the illustrated portion of roadway 134 has imposed legal restrictions with regard to the use of wireless communication devices by a driver of a moving vehicle in the restricted communication zone 136. For example, the zone 136 could be: a portion of the roadway adjacent a school (a school zone); a section of roadway in which workers are engaged in construction (a construction zone); or the boundaries of a municipality or city through which roadway 134 passes. Different types of restrictions may be imposed on the use of wireless communication devices by drivers in different types of zones and/or by different governmental entities.

Warning zones 138 and 140 are segments of roadway adjacent each of the left and right boundaries on the restricted communication zone 136. The warning zones provide for sufficient time for the driver of the vehicle to receive an alert prior to entering the restricted communication zone 136. This warning time will preferably take into account the maximum speed limit on the roadway in the warning zone segments. Information of the location of the restricted communication zone 136, the type of communication restrictions in that zone, and preferably the maximum speed limit in the warning zone segments is stored in the restriction database 126. Since the purpose of the warning zone is to provide sufficient time for a driver who is engaged in wireless communications to receive an alert prior to entering the restricted communication zone, the distance and/or time that defines the warning zone may be ascertained or computed by the restriction database 126 or the application server 120. For example, the application server may use a predetermined amount of warning time, e.g. 20 seconds, and assume a speed of the vehicle, e.g. 60 mph, to calculate the width (distance) of the warning zone which is adjacent the beginning of the restricted communication zone. This will be discussed in further detail below. The warning zone may have different geographical configurations such as a closed geometrical shape surrounding a restricted zone being an entire city. In the illustrated example, the wireless mobile unit used by the driver of vehicle 132 is supported by the RANs of system 130.

Figure 2:
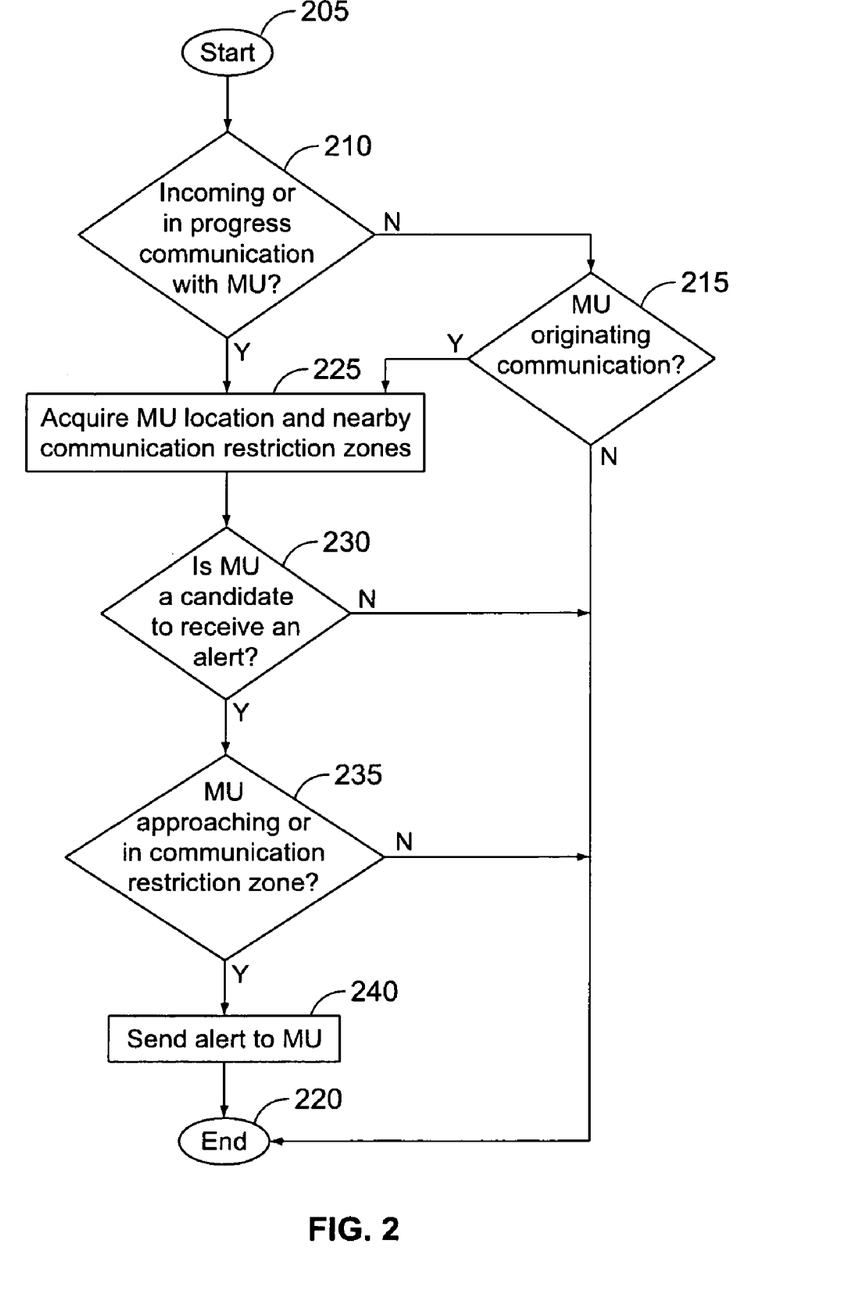
FIG. 2 is a flow diagram of a method in accordance with an embodiment of the present invention in which a determination is made of whether to send an alert to a mobile unit.

FIG. 2 shows a flow diagram of a method in accordance with an embodiment of the present invention in which a determination is made of whether to send an alert to a mobile unit. The process begins at START 205. In step 210 a determination is made of whether an incoming communication or an in progress communication exists with the mobile unit. A NO determination results in processing by step 215 in which a determination is made of whether the mobile unit is originating a communication. A NO determination by the step results in termination of this process at END 220 since the mobile unit is not involved in wireless communications and hence is not subject to such restrictions. Although warning alerts could be sent to all mobile units approaching a predetermined zone, this will result in substantial increased message traffic and would be applicable to only a fraction of those receiving such alerts.

A YES determination by step 210 or by step 215 results in step 225 wherein the application server acquires the mobile unit location from the location server and nearby communication restriction zones from the restriction database. The restriction zone locations relevant to the current location of the mobile unit can be determined by using the current location of the mobile unit as an index to retrieve records stored in the restriction database that have communication restriction zones within a predetermined distance, e.g. 0.5 mile, of the mobile unit. The locations can be stored in various formats, i.e. latitude and longitude coordinates, map coordinates, locations relative to cellular RANs, etc., and if needed, the location information of the mobile unit can be converted into an appropriate location format to match that used in the restriction database or vice versa. Records stored in the restriction database 126 can be in various forms. For example, a record for a restriction zone associated with a roadway could consist of the location of one end of the zone, the location on the other end of the zone, and the type of wireless restriction to be observed within the zone. Additionally, roadway location data such as is available on GPS location devices designed for vehicular use can be stored in the restriction database or made accessible. The storage of the types of restrictions can be represented by an alphanumeric character in a restriction field to simplify and limit the storage required, i.e. 1=no transmission of text messages, 2=no transmission or reading of text messages, 3=no voice calls except using a hands-free mode, 4=no voice calls, 5=2+4 (no transmission or reading of text messages and no voice calls), 6=no transmission or reading of email, etc.

In step 230 a determination is made of whether the mobile unit is a candidate to receive an alert. That is, the target candidates are users of mobile units who are drivers in a moving vehicle as opposed to the user of mobile unit who is walking on a path near a roadway or a user who is a passenger in a mobile unit. A series of the locations of the same mobile unit over known time intervals can be utilized to determine that the mobile unit is likely in a vehicle, i.e. based on the computed speed of the mobile unit and/or its location being on or near a roadway. The vehicle's direction of travel on a roadway will identify communication restriction zones that are likely to be encountered. Preferably, the location of the roadway on which the vehicle is currently traveling can be determined based on stored location data of roadways as is currently available on GPS location devices designed for vehicular use. Thus, a mobile unit traveling in a vehicle can be distinguished from the user of a mobile unit who is walking near a roadway. In the situation in which the mobile unit of the driver receives an incoming wireless communication or originates an outgoing wireless communication while the vehicle is in a restricted communication zone, step 225 can also identify this restricted communication zone.

A more significant challenge is to distinguish the passenger and driver in a vehicle who may both utilize a mobile unit. Most legal restrictions, which are intended to promote safety, apply only to the use of the mobile unit by the driver, i.e. use of the mobile unit even within a restricted zone by passenger is not prohibited. Since both the driver and passenger will be in the moving vehicle, only determining that a mobile unit is a moving vehicle is not sufficient to distinguish between the use by a driver and a passenger. One approach is to request that users who are or will soon be traveling in a moving vehicle identify whether they will be a driver of the vehicle. For example, a predetermined SMS text message of "driver" sent to a predetermined telecommunication node, e.g. the application server, can be associated with the particular mobile unit and stored as a record in a database to identify this mobile unit as being used by a driver. Such a record can be updated by the user to terminate the status of the mobile user as associated with a driver such as by transmitting a different predetermined SMS text message, e.g. "not driver", to the application server. Similarly, a telephone call placed to a predetermined telephone number associated with the application server could be used to associate a particular mobile unit and store a corresponding record in a database to identify mobile usage by a driver. A second call by a mobile unit to the predetermined telephone number, or an alternate number, could be used to disassociate the subject mobile unit as being a driver. The driver identifying records can be stored in the application server itself, the restriction database or other convenient data storage location as long as this information can be accessed by the application server. These techniques to determine whether a mobile unit in a vehicle is in use by a driver may be implemented at nodes in the telecommunication infrastructure other than the application server in order to minimize command and control messages within the communication system. A NO determination by step 230 results in termination of the process at END 220. A YES determination by step 230 results in further processing by step 235.

In step 235 the determination is made of whether the mobile unit is approaching or in a communication restriction zone. A NO determination by the step results in termination of the processing at END 220 since there is no need to generate an alert message. A YES determination indicates that the mobile unit is either sufficiently close to the beginning of a restricted communication zone or already in such a zone. This results in processing by step 240 in which a wireless alert message is sent to the subject mobile unit to alert the driver of the vehicle to the legally imposed wireless communication restriction. Following this step, the process terminates at END 220.

Figure 3:
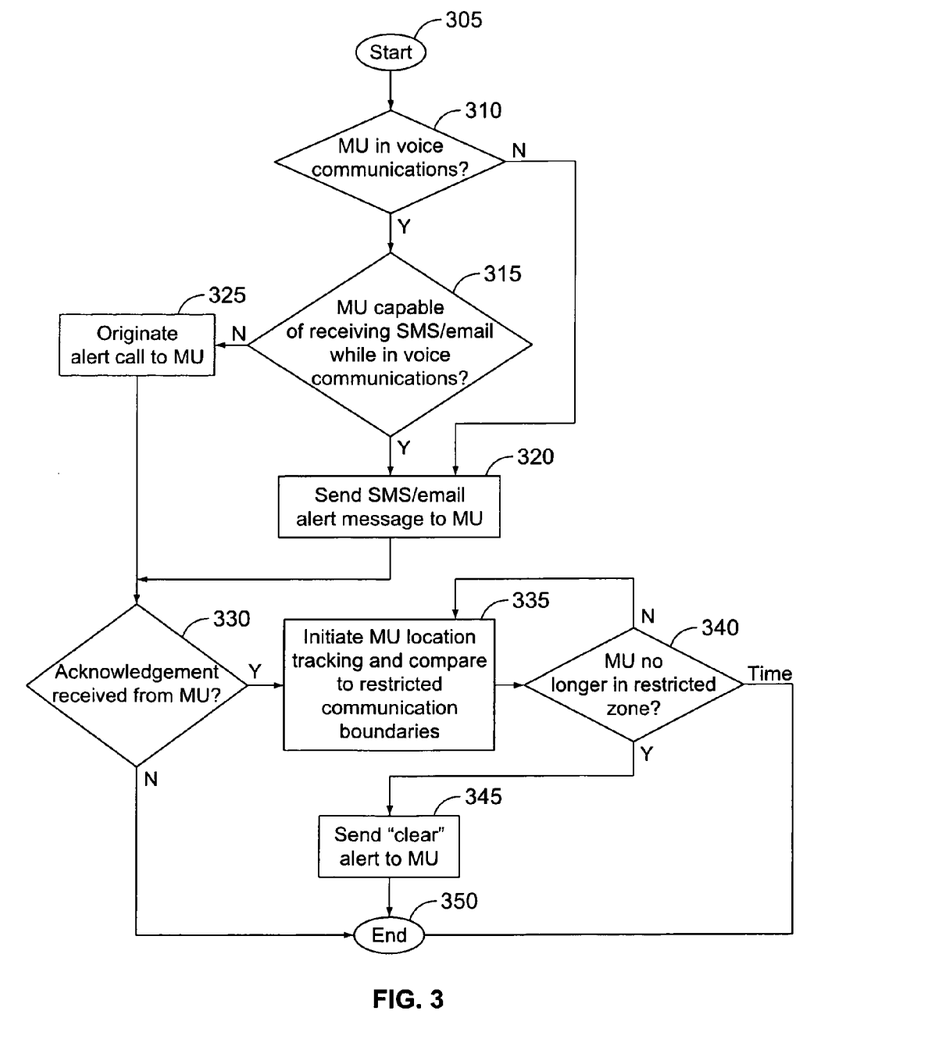
FIG. 3 is a flow diagram of a method in accordance with an embodiment of the present invention illustrating the transmission of alerts to a mobile unit.

FIG. 3 shows a flow diagram of a method in accordance with an embodiment of the present invention illustrating the transmission of alerts to a mobile unit. The process begins with START 305 and continues to step 310 in which a determination is made of whether the mobile unit is in voice communications, i.e. whether the subject mobile unit is originating a voice call or in an ongoing voice communication. A YES determination by step 310 results in step 315 making a determination of whether the mobile unit is capable of receiving an SMS text message or email while in simultaneous voice communications. This information may be determined based on the type of handset being utilized and wireless communication provider, such information being available in the telecommunications infrastructure, i.e. the user's HLR. A NO determination by step 315, indicating that the mobile unit is not capable of such simultaneous communications, results in the origination of an alert call to the mobile unit at step 325. The request for the origination of the alert call may be generated by the application server. Preferably, this alert call will have an identifying attribute that will signify to the driver of the receiving mobile unit that the user is in or approaching a restricted communication zone. Since this alert call will be delivered as a call waiting call since the subject unit is in an existing voice communication, it is preferred that the calling party (application server) telephone number or caller ID information provide the desired alert to the driver. Preferably this information will include information identifying the type of communication restriction, e.g. voice calls prohibited except when using hands-free mode, and the nature of the zone itself, e.g. school zone. This can be presented in the form of alphanumeric characters associated with the incoming caller ID presented as a call waiting type call. The information can be in a spelled out form of a text message or can utilize predetermined codes that will have been made known to wireless mobile unit users, e.g. "NOwirecomm"=no form of wireless communications is permitted, "handsfreeonly"=only hands-free wireless communications are permitted, etc. Alternatively, the presented incoming call telephone number can correspond to predetermined codes previously made known to wireless users, e.g. "111-222-0003", where 111 indicates the call was from the application server, 222 corresponds to a code indicating only hands-free wireless communications are permitted in the restricted zone, and 0003 indicates that the type of restriction zone is a school zone. Additionally, the distance to the beginning of the boundary of the predetermined zone can be computed and provided to the user of the mobile unit.

A NO determination by step 310 or a YES determination by step 315 results in further processing by step 320. Reaching this step indicates that the subject mobile unit is in voice communications but is capable of simultaneously receiving an SMS/e-mail communication or that the mobile unit is in communications using SMS/e-mail. In either situation, the subject mobile unit is capable of receiving an SMS text message and/or an e-mail message. In step 320 the application server causes an SMS text message or e-mail communication to be sent to the subject mobile unit as a communication restriction alert message.

Following the transmission of an alert communication to the subject mobile unit by step 325 or step 320, processing continues to a determination by step 330 in which a determination is made of whether an acknowledgment has been received from the subject mobile unit. A NO determination by step 330 results in the process terminating at END 350. A YES determination by step 330, indicating that an acknowledgment was received from the mobile unit, causes step 335 to initiate tracking of the mobile unit location and comparing the location of the mobile unit to the location boundaries of the restricted communication zone. In step 340 a determination is made of whether the mobile unit is no longer in the restricted communication zone. A NO determination by this step results in processing continuing by step 335. A YES determination by step 340, indicating the mobile unit is no longer subject to communication restrictions by the subject zone, results in step 345 as implemented by the application server sending a "clear" alert message to the subject mobile unit indicating that the communication restriction has ended. The clear alert message preferably is in the same format, i.e. voice call or an SMS text message/e-mail, as used to provide the initial alert communication to the mobile unit. The clear alert message may also use a similar format as explained above to communicate that the mobile unit is now clear of the communication restrictions zone. Following step 345, processing terminates at END 350. Alternatively, after a predetermined time interval, step 340 will time out terminating processing at END 350. Such a timeout terminates the processing in the case where communication is lost with the mobile unit or the mobile unit stops for a substantial time in the restricted zone during the processing by steps 335 and 340.

Figure 4:
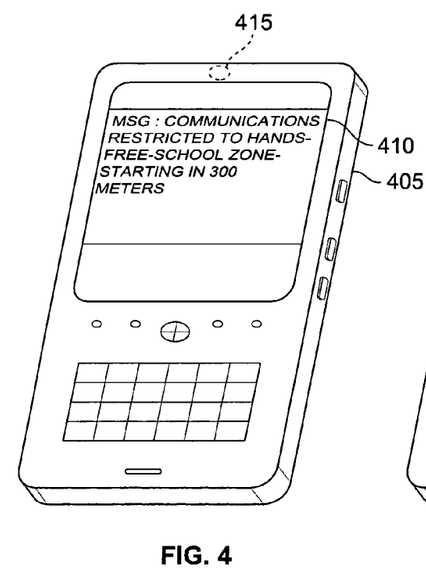
FIG. 4 shows an exemplary mobile unit having received an alert in accordance with a one embodiment of the present invention.

FIG. 4 shows an exemplary mobile unit having received an alert in accordance with one embodiment of the present invention. Mobile unit 405 in this example is a cellular telephone used by a driver of a moving vehicle. As shown on the screen 410, an alert message in the form of an SMS text message has been received advising the driver that communication restrictions exist for an upcoming zone along the roadway being traveled. The alert alphanumeric message states: "Communications restricted to hands-free-school zone—starting in 300 meters". This message is merely representative of a variety of restricted communication information that can be conveyed by alphanumeric messages. Various text and codes can be utilized to convey the location of the communication restriction zone relative to the location of the mobile unit, the type of restriction zone, and the type of restrictions imposed in the zone. Various colors, fonts and/or shading can be utilized to distinguish different types of messages and the associated restrictions.

In addition to providing a visual alert, the mobile unit can be configured to provide the user (driver) an audible alert by speaker 415. For example, a mobile unit can be configured to generate a predetermined audible sound or ring tone upon the receipt of an alphanumeric-based alert message having an origination address associated with the application server. Assuming the mobile unit is capable of associating audible sounds based on different predetermined strings of alphanumeric characters contained in a text message, different audible sounds associated with different types of communication restriction alerts can be automatically generated upon the receipt of the alphanumeric alert message.

Figure 5:
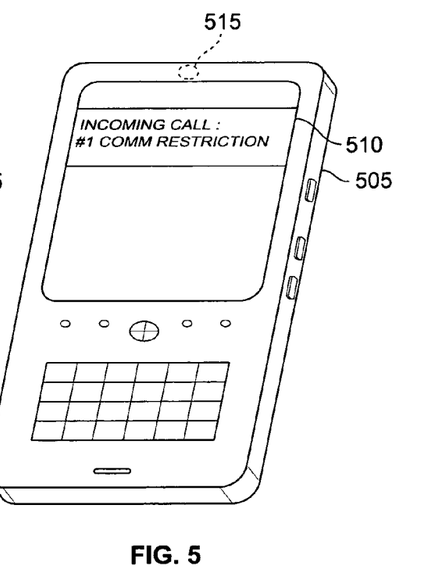
FIG. 5 shows an exemplary mobile unit having received an alert in accordance with another embodiment of the present invention.

FIG. 5 shows an exemplary mobile unit having received an alert in accordance with another embodiment of the present invention. Mobile unit 505 in this example is a cellular telephone used by a driver of a moving vehicle. As shown on screen 510, an alert message is in the form of calling party identification of an incoming call. The purpose of this alert is to convey to the driver that wireless communication restrictions exist in a current or upcoming zone. In this illustrative example, the calling party identification is: "#1 comm restriction". This calling party identification is associated with a certain telephone number used by the application server. Preferably a plurality of telephone numbers are associated with the application server where each different telephone number represents different information concerning a communication restriction. In this example, the "#1" portion of the calling party identification corresponds to a predetermined code known to users of mobile units, and means that no wireless communications of any form are permitted by the driver of a moving vehicle in the upcoming communication restriction zone. Additionally, further codes can be utilized to identify the type of restriction zone and/or the distance of the mobile unit to the beginning of the restriction zone. Various colors, fonts and/or shading can be utilized to distinguish different types of alerts and the associated restrictions.

In addition to providing a visual alert, the mobile unit can be configured to provide the user (driver) an audible alert by speaker 515. For example, a mobile unit can be configured to generate a predetermined audible sound, ring tone or spoken speech message upon the receipt of an incoming call having a caller ID associated with the application server. Different audible sounds associated with different types of communication restriction alerts can be automatically generated based on the reception of different corresponding caller ID identifications as originated by the application server.

Figure 6:
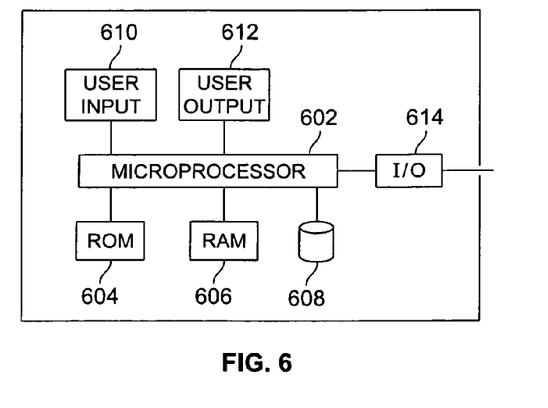
FIG. 6 shows an exemplary block diagram of an application server.

FIG. 6 shows an exemplary block diagram of an application server. A microprocessor 602 performs processes and tasks based on stored program instructions. It is supported by read-only memory (ROM) 602, random access memory (RAM) 606 and nonvolatile data storage device 608. As will be understood by those skilled in the art, data and stored program instructions in ROM 602 is typically utilized by microprocessor 602 to initialize and boot the computing apparatus. An application program, e.g. a program that controls the implementation of one or more functions performed by the application server, is stored in storage element 608. At least active portions of the application program will be typically stored in RAM 606 for ready access and processing by microprocessor 602. The application program is specific to the functions to be performed by the application server, and performs the functions and steps as described above. A variety of user inputs 610 such as a keyboard, keypad, and mouse can be utilized to control the operation of the application server and application running on it. User outputs 612, e.g. a display monitor, provide output for an administrator of the device, e.g. characters and or charts of operational parameters and related status of the device and functions. An input/output (I/O) module 614 provides a communication interface permitting microprocessor 602 to transmit and receive data with external nodes. The elements in FIG. 6 form a microprocessing unit.

The application server in one example employs one or more computer-readable signal-bearing tangible media. The computer-readable signal-bearing tangible media store software, firmware and/or assembly language for performing one or more portions of one or more embodiments of the invention. The computer-readable signal-bearing tangible medium may comprise one or more of a magnetic, electrical, optical, biological, and atomic data storage tangible medium. For example, the computer-readable signal-bearing tangible medium comprise floppy disks, magnetic tapes, CD-ROMs, DVD-ROMs, hard disk drives, and electronic memory.

Although exemplary implementations of the invention have been depicted and described in detail herein, it will be apparent to those skilled in the art that various modifications, additions, substitutions, and the like can be made without departing from the spirit of the invention. For example, communication systems that support different types of signaling, i.e. analog, TDMA, CDMA, GSM, IP, etc., can incorporate embodiments of the present invention to provide mobile users with alerts of zones that impose legal restrictions on the usage of wireless communication devices by drivers in a moving vehicle. The information used to identify the locations of such zones, the location of mobile units, and the type of restrictions imposed in a zone can be stored in various nodes in the communication infrastructure and/or accessed from other sources, i.e. from the mobile units or other database resources outside the communications system.

The scope of the invention is defined in the following claims.

We claim:

1. A method for providing to a wireless mobile unit an alert representing a warning that legally imposed restrictions on the use of wireless mobile units by drivers of moving vehicles in predetermined zones, the method comprising:

determining by a communication system if a first mobile unit is being used for wireless communications;

acquiring by the communication system the location of the first mobile unit;

comparing by the communication system the location of the first mobile unit to locations of said predetermined zones having restrictions on the use of wireless mobile units by drivers of moving vehicles;

upon the first mobile unit entering a warning zone that is adjacent the predetermined zone and the first mobile unit being used for wireless communications, initiating the transmission of an alert to the first mobile unit where the alert causes the first mobile unit to output an audible or visual communication available to the user of the first mobile unit, said audible or visual communication providing a warning that a legally imposed restriction on the use of the first wireless mobile unit by a driver of moving vehicle is imposed in the predetermined zone.

2. The method of claim 1 further comprising determining that the first mobile unit is moving towards the predetermined zone.

3. The method of claim 1 further comprising determining that the first mobile unit is in a moving vehicle based on a calculation of the speed at which the first mobile unit is traveling based on a computed distance between a first and second location of the mobile unit and the elapsed time to travel between the first and second locations.

4. The method of claim 1 further comprising receiving a communication from the first mobile unit where the communication identifies the first mobile unit as being used by the driver of a vehicle, said step of initiating the transmission of an alert further requiring a condition precedent of the first mobile unit having been identified as being used by the driver of a vehicle.

5. The method of claim 1 further comprising determining that the first mobile unit is engaged in a voice communication with another party, said step of initiating the transmission of the alert to the first mobile unit comprising initiating a warning telephone call to the first mobile unit wherein the warning telephone call causes the first mobile unit to output audible or visual indicia representing that a legally imposed restriction on the use of mobile units by drivers of a moving vehicle is imposed in a nearby predetermined zone.

6. The method of claim 1 further comprising determining that the first mobile unit is engaged in a text-based communication with another party, said step of initiating the transmission of the alert to the first mobile unit comprising generating and transmitting a warning text-based message to the first mobile unit wherein the warning text-based message causes the first mobile unit to output audible or visual indicia representing that a legally imposed restriction on the use of mobile units by drivers of a moving vehicle is imposed in a nearby predetermined zone.

7. The method of claim 1 further comprising determining that the first mobile unit is engaged in a voice communication with another party, determining that the first mobile unit is capable of receiving a text-based message while remaining engaged in the voice communication, the step of initiating the transmission of the alert to the first mobile unit comprising generating and transmitting a warning text-based message to the first mobile unit wherein the warning text-based message causes the first mobile unit to output audible or visual indicia representing that a legally imposed restriction on the use of mobile units by drivers of a moving vehicle is imposed in a nearby predetermined zone.

8. The method of claim 1 further comprising receiving an acknowledgment communication from the first mobile unit in response to the first mobile unit having received the transmission of the alert, monitoring the location of the first mobile unit relative to the predetermined zone, and upon the first mobile unit exiting the predetermined zone, transmitting a further message to the first mobile causes the first mobile unit to output audible or visual indicia representing that the first mobile unit is no longer subject to the predetermined zone.

9. A computer program product, comprising a computer usable tangible medium having a computer readable program code embodied therein, said computer readable program code adapted to be executed to implement a method for providing to a wireless mobile unit an alert representing a warning that legally imposed restrictions on the use of wireless mobile units by drivers of moving vehicles in predetermined zones, the method comprising:

determining by a communication system if a first mobile unit is being used for wireless communications;

acquiring by the communication system the location of the first mobile unit;

comparing by the communication system the location of the first mobile unit to locations of said predetermined zones having restrictions on the use of wireless mobile units by drivers of moving vehicles;

upon the first mobile unit entering a warning zone that is adjacent the predetermined zone and the first mobile unit being used for wireless communications, initiating the transmission of an alert to the first mobile unit where the alert causes the first mobile unit to output an audible or visual communication available to the user of the first mobile unit, said audible or visual communication providing a warning that a legally imposed restriction on the use of the first wireless mobile unit by a driver of moving vehicle is imposed in the predetermined zone.

10. The computer program product of claim 9 in which the method further comprises determining that the first mobile unit is in a moving vehicle based on a calculation of the speed at which the first mobile unit is traveling based on a computed distance between a first and second location of the mobile unit and the elapsed time to travel between the first and second locations.

11. The computer program product of claim 9 in which the method further comprises receiving a communication from the first mobile unit where the communication identifies the first mobile unit as being used by the driver of a vehicle, said step of initiating the transmission of an alert further requiring a condition precedent of the first mobile unit having been identified as being used by the driver of a vehicle.

12. An application server disposed in a communication system where the application server provides to a wireless mobile unit an alert representing a warning that legally imposed restrictions on the use of wireless mobile units by drivers of moving vehicles in predetermined zones, the application server comprising:

a microprocessing unit that accesses information from other nodes in the communication unit to determine if a first mobile unit is being used for wireless communications;

the microprocessing unit acquiring information from other nodes in the communication unit to determine the location of the first mobile unit;

the microprocessing unit making comparisons the location of the first mobile unit to locations of said predetermined zones having restrictions on the use of wireless mobile units by drivers of moving vehicles;

upon the microprocessing unit determining that the first mobile unit has entered a warning zone that is adjacent the predetermined zone and that the first mobile unit being used for wireless communications, the microprocessing unit causing the initiation of the transmission of an alert to the first mobile unit where the alert causes the first mobile unit to output an audible or visual communication available to the user of the first mobile unit, said audible or visual communication providing a warning that a legally imposed restriction on the use of the first wireless mobile unit by a driver of moving vehicle is imposed in the predetermined zone.

13. The application server of claim 12 further comprising the microprocessing unit determining that the first mobile unit is moving towards the predetermined zone.

14. The application server of claim 12 further comprising the microprocessing unit determining that the first mobile unit is in a moving vehicle based on a calculation of the speed at which the first mobile unit is traveling based on a computed distance between a first and second location of the mobile unit and the elapsed time to travel between the first and second locations.

15. The application server of claim 12 further comprising the microprocessing unit receiving a communication from the first mobile unit where the communication identifies the first mobile unit as being used by the driver of a vehicle, the microprocessing unit requiring a further condition precedent to said initiating the transmission of the alert, the condition precedent being the first mobile unit having been identified as being used by the driver of a vehicle.

16. The application server of claim 12 further comprising the microprocessing unit determining that the first mobile unit is engaged in a voice communication with another party, said initiating the transmission of the alert to the first mobile unit comprising the microprocessing unit initiating a warning telephone call to the first mobile unit wherein the warning telephone call causes the first mobile unit to output audible or visual indicia representing that a legally imposed restriction on the use of mobile units by drivers of a moving vehicle is imposed in a nearby predetermined zone.

17. The application server of claim 12 further comprising the microprocessing unit determining that the first mobile unit is engaged in a text-based communication with another party, said initiating the transmission of the alert to the first mobile unit comprising the microprocessing unit generating and transmitting a warning text-based message to the first mobile unit wherein the warning text-based message causes the first mobile unit to output audible or visual indicia representing that a legally imposed restriction on the use of mobile units by drivers of a moving vehicle is imposed in a nearby predetermined zone.

18. The application server of claim 12 further comprising the microprocessing unit determining that the first mobile unit is engaged in a voice communication with another party, the microprocessing unit also determining that the first mobile unit is capable of receiving a text-based message while remaining engaged in the voice communication, the initiating the transmission of the alert to the first mobile unit comprising the microprocessing unit generating and transmitting a warning text-based message to the first mobile unit wherein the warning text-based message causes the first mobile unit to output audible or visual indicia representing that a legally imposed restriction on the use of mobile units by drivers of a moving vehicle is imposed in a nearby predetermined zone.

19. The application server of claim 12 further comprising the microprocessing unit receiving an acknowledgment communication from the first mobile unit in response to the first mobile unit having received the transmission of the alert, the microprocessing unit monitoring the location of the first mobile unit relative to the predetermined zone, and upon the first mobile unit exiting the predetermined zone, the microprocessing unit transmitting a further message to the first mobile causes the first mobile unit to output audible or visual indicia representing that the first mobile unit is no longer subject to the predetermined zone.

* * * * *